United States Patent
García Castelblanco (10) Patent No.: US 10,631,480 B2
(45) Date of Patent: Apr. 28, 2020

(54) METHOD FOR OBTAINING ROOT MASS FROM VEGETABLE SEEDS AND ROOT MASS OBTAINED THEREOF

(71) Applicant: Roberto García Castelblanco, Los Ángeles (CL)

(72) Inventor: Roberto García Castelblanco, Los Ángeles (CL)

(73) Assignee: Roberto García Castleblanco, Los Ángeles (CL)

(*) Notice: Subject to any disclaimer, the term of this patent is extended or adjusted under 35 U.S.C. 154(b) by 31 days.

(21) Appl. No.: 15/750,935

(22) PCT Filed: Aug. 4, 2016

(86) PCT No.: PCT/CL2016/050046
§ 371 (c)(1),
(2) Date: Feb. 7, 2018

(87) PCT Pub. No.: WO2017/024419
PCT Pub. Date: Feb. 16, 2017

(65) Prior Publication Data
US 2019/0124863 A1    May 2, 2019

(30) Foreign Application Priority Data
Aug. 7, 2015  (CL) .................................. 2215-2015

(51) Int. Cl.
*A01G 31/02*    (2006.01)
(52) U.S. Cl.
CPC ............ *A01G 31/02* (2013.01); *Y02P 60/216* (2015.11)

(58) Field of Classification Search
USPC ......................................................... 47/59 R
See application file for complete search history.

(56) References Cited

U.S. PATENT DOCUMENTS

| | | | | |
|---|---|---|---|---|
| 3,103,763 A | * | 9/1963 | Malchair ................ | A01G 31/02 47/16 |
| 3,305,968 A | * | 2/1967 | Dosedla ................ | A01G 31/02 47/62 R |

(Continued)

FOREIGN PATENT DOCUMENTS

| | | | | |
|---|---|---|---|---|
| EP | 0576116 A1 | | 12/1993 | |
| GB | 464853 A | * | 4/1937 | ............... A01C 1/02 |

(Continued)

OTHER PUBLICATIONS

Kitaya et al. "Growth of Vegetables Suspended Upside Down." ISHS Acta Horticulturae 303, 1992. (6 pages).

(Continued)

*Primary Examiner* — Magdalena Topolski
*Assistant Examiner* — Morgan T Barlow
(74) *Attorney, Agent, or Firm* — Procopio, Cory, Hargreaves & Savitch LLP (57) ABSTRACT

The present invention relates to agriculture, and particularly relates to a process for obtaining a root mass from plant seeds which are subjected to particular conditions of germination in hydroponic culture, and once germinated, placed in conditions that favor the development of its root system. The root mass thus obtained can have multiple industrial applications such as material alternative to wood for thermal and acoustic insulation and fire-resistant construction.

8 Claims, 5 Drawing Sheets

(56) References Cited

U.S. PATENT DOCUMENTS

| | | | |
|---|---|---|---|
| 3,327,425 A | | 6/1967 | Cestmir et al. |
| 3,648,409 A | * | 3/1972 | Johnson .................. A01C 1/06 47/57.6 |
| 3,703,051 A | * | 11/1972 | Weinberger ............. A01G 7/04 47/58.1 R |
| 3,717,085 A | * | 2/1973 | Taketoshi ............... A01G 31/02 134/130 |
| 3,900,963 A | * | 8/1975 | Tukacs .................. A01G 20/00 47/58.1 R |
| 3,911,619 A | * | 10/1975 | Dedolph ................ A01G 31/02 47/14 |
| 3,931,695 A | * | 1/1976 | Widmayer ............. A01G 7/045 47/59 R |
| 4,023,308 A | * | 5/1977 | Staby ....................... A01G 9/00 47/79 |
| 4,067,715 A | * | 1/1978 | Willard, Sr. ........... A01G 23/02 71/24 |
| 4,190,981 A | * | 3/1980 | Muldner ................ A01G 20/20 47/56 |
| 4,237,651 A | * | 12/1980 | Caballero ............. A01G 31/00 47/14 |
| 4,244,146 A | * | 1/1981 | Kranz ...................... A01G 9/14 47/17 |
| 4,272,276 A | * | 6/1981 | Szejtli .................... A01N 43/16 504/292 |
| 4,317,310 A | * | 3/1982 | Bollinger ............... A01N 25/32 47/57.6 |
| 4,454,684 A | | 6/1984 | O'Hare |
| 4,551,942 A | * | 11/1985 | Brown ..................... A01C 1/02 47/14 |
| 4,765,092 A | * | 8/1988 | Cline ....................... A01C 1/02 47/61 |
| 5,107,621 A | | 4/1992 | Deutschmann, Sr. |
| 5,636,474 A | | 6/1997 | Lo |
| 6,256,926 B1 | * | 7/2001 | Nakada ................ A01G 9/0293 47/61 |
| 6,345,466 B1 | | 2/2002 | Venanzi |
| 6,379,732 B1 | * | 4/2002 | Nakada .................. A23N 15/04 426/481 |
| 6,668,486 B2 | * | 12/2003 | Lo .......................... A01G 31/06 47/61 |
| 2002/0124465 A1 | * | 9/2002 | Kharkwal ................ A01C 1/02 47/58.1 SE |
| 2003/0235644 A1 | * | 12/2003 | Roh ....................... A01G 7/045 426/598 |
| 2012/0171456 A1 | | 7/2012 | Bravo et al. |
| 2012/0277117 A1 | | 11/2012 | Zayed et al. |
| 2013/0212940 A1 | | 8/2013 | Blyden |
| 2016/0353656 A1 | * | 12/2016 | Breukink ................ A01C 1/06 |
| 2019/0104697 A1 | * | 4/2019 | Mendes .................... A01G 9/02 |

FOREIGN PATENT DOCUMENTS

| | | |
|---|---|---|
| WO | 1994/013129 A1 | 6/1994 |
| WO | 2011/029210 A1 | 3/2011 |

OTHER PUBLICATIONS

Kitaya, Y., et al., Growth of Vegetables Suspended Upside Down, Acta Hortic, 303, pp. 79-84.

Resolution of Notification of Expert Response of Allowance for related CL App No. 2015-002215, dated Jan. 23, 2018, 17 pgs.

Resolution of Notification of Expert Report for related CL App No. 2015-002215, dated Aug. 4, 2017, 14 pgs.

International Search Report and Written Opinion for related PCT Application No. PCT/CL2016/050046, dated Apr. 12, 2017; 10 pages.

Webpage entitled "Growing pot upside down?" by LEAFCHIK. URL <https://forum.grasscity.com/threads/growing-pot-upside-down.218731>Mar. 24, 2008. Retrieved from the internet on Feb. 6, 2018; 22 pages.

Webpage entitled "Inverted Hydroponics?" by The.Fatman. Cometh. URL <http://www.greenpassion.org/topic/211-inverted-hydroponics/> Aug. 7, 2007. Retrieved from the internet on Feb. 6, 2018; 7 pages.

\* cited by examiner

METHOD FOR OBTAINING ROOT MASS FROM VEGETABLE SEEDS AND ROOT MASS OBTAINED THEREOF

CROSS-REFERENCE TO RELATED APPLICATIONS

This application is a U.S. National Stage entry of PCT Application No: PCT/CL2016/050046 filed Aug. 4, 2016, which claims priority to Chilean Patent Application No. 2215-2015, filed Aug. 7, 2015, the contents of which are incorporated herein by reference.

FIELD OF THE INVENTION

The present invention relates to the field of agriculture, and particularly relates to a process for obtaining root mass from vegetable seeds which germinate under particular hydroponic conditions. The root mass thus obtained can have multiple industrial applications, such as alternative construction materials to wood, for its properties such as: thermal insulation, acoustic absorption and fire resistance, among others. Additionally, during the drying process of this root mass, it is possible to obtain an extract with useful properties for pharmaceutical, cosmetic and food industries.

BACKGROUND OF THE INVENTION

Today, natural resources are becoming scarcer and more required goods, which in the long-term means an increase in production costs of raw materials. The United Nations Environment Programme (UNEP) urges to optimize the development of natural resources in a sustainable way and to maximize the obtaining of raw materials (Corvalán C. et al. (2005) Ecosystems and human well-being: health synthesis: a report of the Millennium Ecosystem Assessment).

A growing technique well known in the prior art that optimizes the use of soil and water resources are crops without soil or hydroponic, by which nutrients dissolved in water are supplied to seeds under appropriate conditions for germination, so that the development of the whole plant under these conditions is finally obtained. Among the advantages of this type of culture in comparison with growth in traditional land it is found the efficient use of nutrients and other inputs, better pest control at lower cost, higher production per square meter planting, among other highlights.

In general industry, it is widely known the commercial value of the aerial parts of plants. For example, grasses such as oats, barley, maize and wheat and their derivatives possess great value for the food industry, and consequently, technological advances are aimed at increasing the development of these. However, there is little knowledge about using roots of these plants. To date, its primary use is as animal fodder, as stated in the "Technical Manual: Green Forage Hydroponic" developed by the Regional Office of FAO for Latin America and the Caribbean, 2001, in which the obtaining of plant biomass from germination of cereals or legumes seeds is taught. To do this, pre-germinated seeds are sown in trays, that is to say, seeds that have been soaked and aired; and then irrigated with water and nutrients for 12 to 14 days to obtain an approximately 30 cm forage with abundant leaves and stems.

A highly innovative alternative to the use of these roots, is as raw material for construction materials. The International patent application PCT/CL2009/000017 discloses a pressed sheet produced from a root mattress obtained from a seed hydroponic culture and an adhesive. This root mattress is essentially obtained by germinating seeds until the leaf component thereof reaches 10 cm height, point at which said leaf component is cut to a 1-1.5 cm height, allowing it to reach 10 cm height again, to cut it back to the height previously mentioned. With this process, the preferred production of the root system over the leaf system is achieved, thus obtaining a root mass which, when drained and dehydrated, allows the obtaining of a support material able to be mixed with an adhesive and then pressed to produce a material that can replace wood, useful in manufacture of panels, boards, planks, among others.

The procedure described above is preferentially used for obtaining root mass from grass seeds germinated in hydroponic conditions. Unfortunately, this method is not efficient in terms of the aerial mass produced, nor the use of resources, since leaves and stems produced must be cut and removed, generating a subsequent loss of resources and time. Therefore, it is required a more efficient methodology for roots production, avoiding unnecessary loss of material and maintaining a high production of mass root, and not aerial mass.

SUMMARY OF THE INVENTION

The present invention relates to a process for obtaining root mass from plant seeds, which is based on germinating seeds in a hydroponic culture under appropriate conditions; once germinated, these seedlings are flipped to expose their roots apically, which remain in that position under certain conditions, and finally the root mass thus obtained is collected.

In a preferred embodiment of the invention, the appropriate conditions to germinate seeds consist of soaking and keeping them soaked between 16 and 24 hours at a temperature between 10 and 18 degrees Celsius. Seeds are then aerated in dark conditions for 24 to 48 hours, keeping the temperature between 10 and 18 degrees Celsius with daily watering.

Once the seeds are germinated under the conditions above mentioned, seedlings are flipped so that their roots become exposed apically, keeping them in that position for three to four days, at a temperature between 10 and 18 degrees Celsius and in dark conditions. Root mass thus obtained is collected and optionally subjected to a water removal process, which can be draining, centrifuging, or pressing the root mass and finally drying it.

In addition to the root mass obtained by the inventive process, which can be used as support material as a substitute for wood material with construction purposes of different types, the invention also includes the extract of said mass obtained during the water removal process to which it is subjected.

BRIEF DESCRIPTION OF THE DRAWINGS

The invention is described with reference to the accompanying drawings, in which.

DETAILED DESCRIPTION OF THE INVENTION

The present invention relates to a novel method for producing a high density of roots in hydroponic cultures and a low content of aerial parts of plants, to create a root mass which can be dried and then pressed for its use in construction industry, or shaped to be used in agriculture and garden industries. Additionally, during the production process of the root mass, a root extract is obtained, which has skin moisturizing properties that can be useful for cosmetic and pharmaceutical industries.

Figure 1A:
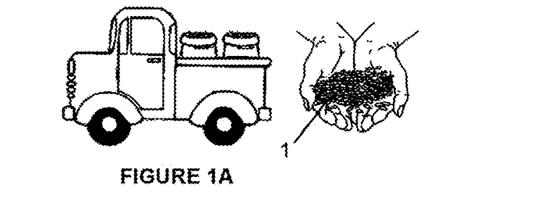
FIGS. 1A to 1F show a representation of the steps in the process of obtaining a root mass.
Figure 1B:
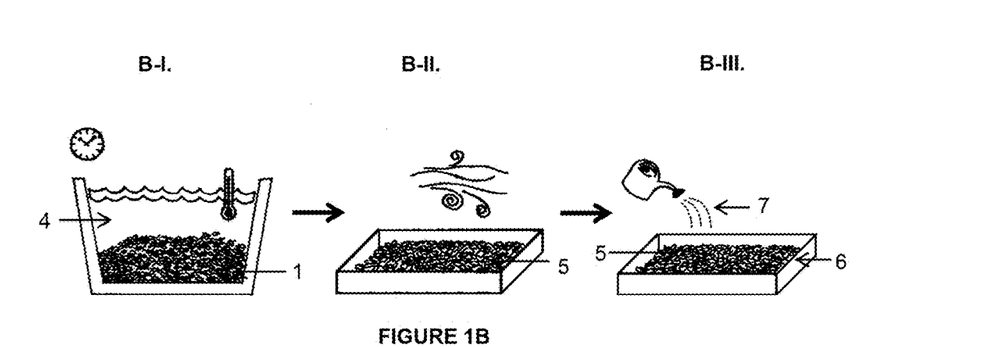
Figure 1C:
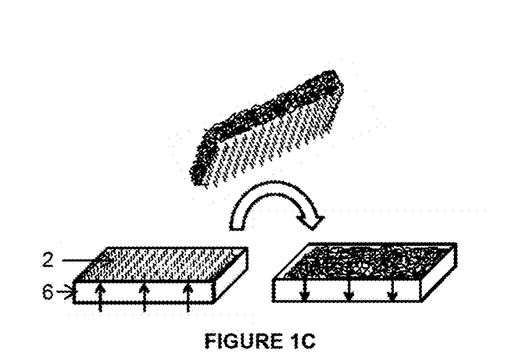
Figure 1D:
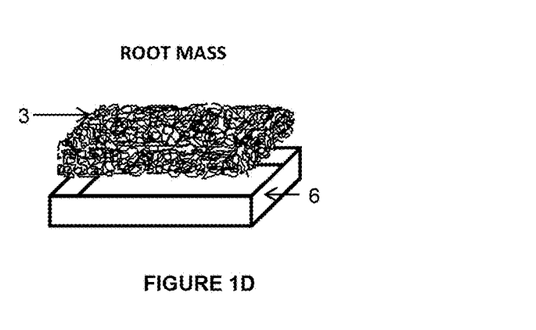

FIGS. 1A to 1F show a representation of the stages comprised to obtain root mass. The method of the present invention comprises in its broadest scope the steps of: providing seeds 1 of a plant as shown in FIG. 1A, allow germination of seeds 1 in particular hydroponic crop conditions as shown in FIG. 1B, flip the seedlings 2 so that their roots are apically exposed, keep them in such position under appropriate conditions as shown in FIG. 1C, and harvest the root mass 3 obtained by this process as shown in FIG. 1D.

In a preferred embodiment of the invention, plant seeds 1 used are those of the Poaceae family (grass seeds), for example, wheat seeds (*Triticum* spp.), oats (*Avena* spp.), corn (*Zea* spp.), rice (*Oryza* spp.), rye (*Secale* spp.), barley (*Hordeum* spp.), Sorghum (*Sorghum* spp.), cane or sugar cane (*Saccharum* spp.), millet (species of the Panicoideae subfamily), but the invention is not limited only to these aforementioned examples.

In a preferred embodiment, the particular conditions of the hydroponic crop shown in FIG. 1B used in this invention, in which the seeds germinate, refer to a process to soak seeds B-I under specific conditions, and aerate seeds in the dark B-II. The specific conditions of soaking B-I of seeds 1 refer to placing the seeds in a soaking solution 4 during a period of time depending on the quality of seeds 1. Preferably, seeds are placed in water as soaking solution 4 for 16 to 24 hours, at a temperature between 10 and 18 degrees Celsius; however, is not limited to these ranges since a lower temperature for longer hours can be also used, or a higher temperature for less time. At this B-I stage, it is optionally included the use of fertilizers, and it is advisable but not mandatory, oxygenate or adequately aerate the water or soaking solution 4. The process B-II to aerate seeds is preferably done by removing the seeds 1 from soaking solution 4 and allowing to stand in a dark chamber between 24 to 72 hours, at a temperature between 10 and 18 degrees Celsius. After obtaining conditioned seeds 5, these are planted or placed in trays or strips 6 for hydroponic culture, in a dark chamber at a temperature between 10 and 18 degrees Celsius, with constant watering 7, as shown in process B-III. Seeds 5 are kept in these conditions for approximately 3 to 4 days, period of time they take to germinate and spread their roots and therefore to obtain germinated seeds 2.

Figure 1E:
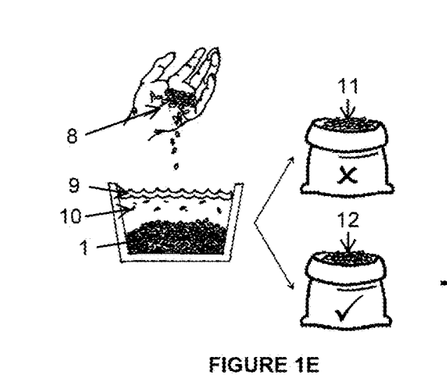
Figure 1F:
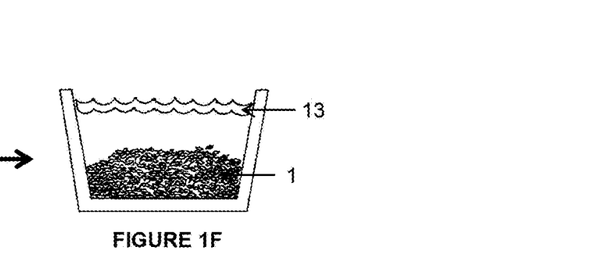
Figure 2:
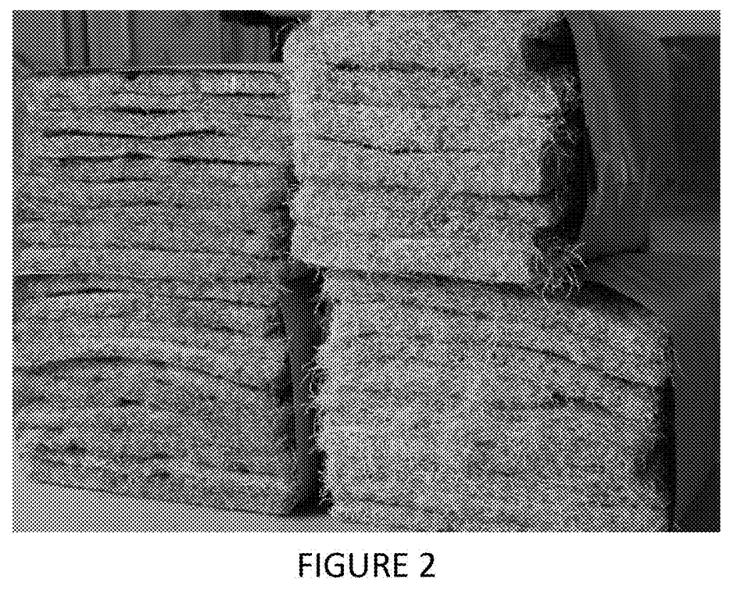
FIG. 2 is a photograph of multiple panels that are obtained as a result of the manufacturing process of the root mass.
Figure 3:
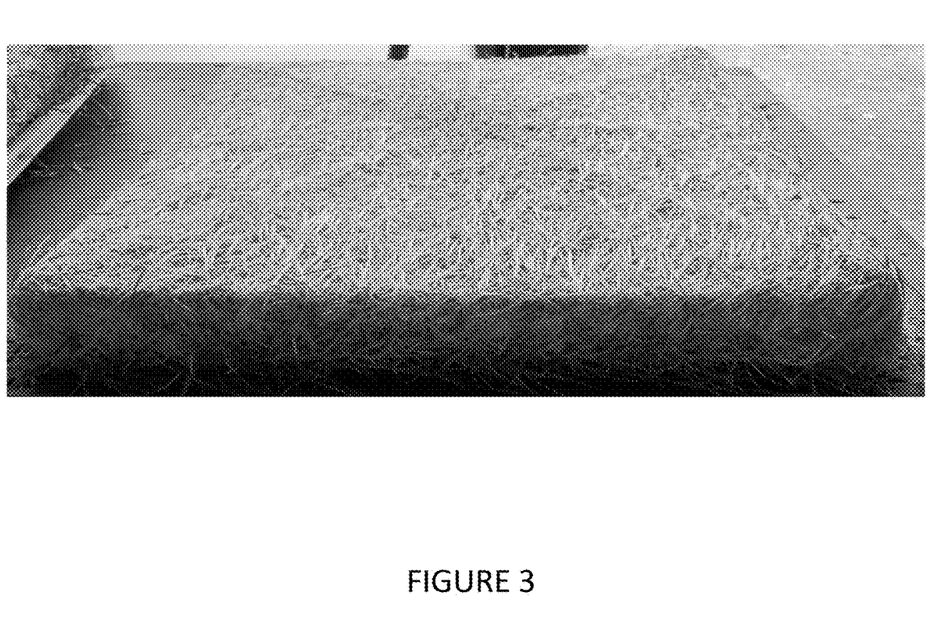
FIG. 3 is a photograph of a front view of a panel obtained as a result of pressing the obtained root mass.

Optionally, prior to the soaking process B-I, steps of selection shown in FIG. 1E, cleaning and disinfection of seeds 1 as shown in FIG. 1F can be included to avoid impurities and thus obtain an even more efficient cultivation. From different batches or sacks of seeds, small amounts are randomly selected from each sack, to complete a kilogram of sample 8. This sample 8 is submerged in enough water 9 to cover all seeds 1 and then it is stirred, wherein seeds that can be used for cultivation (quality seeds) sink, while empty seeds together with impurities 10 float on the water surface 9. If the amount of empty seeds and impurities 10 exceeds 20%, the corresponding batch or bag is rejected 11 and is not used for hydroponic planting. Once the seeds are selected 12, these can be washed and disinfected F with an appropriate disinfection solution 13 for 3 to 5 minutes, and then rinsed with sufficient water to remove disinfection solution 13.

In a preferred embodiment, after holding the seeds in the particular hydroponics conditions shown in FIG. 1B previously mentioned during a period of approximately 3 to 4 days, these seedlings 2 are flipped, thus exposing their roots upwards, and are maintained under these conditions for 3 to 4 days at a temperature between 18 degrees Celsius in a dark chamber such as the one shown in FIG. 1C. Natural growth of roots in plants presents a positive geotropism, i.e. roots grow following the effect of gravity. In the present invention, this natural behavior is used to promote root growth predominantly over the aerial portion of the plant, thus achieving a dense root mass 3 that is well interwoven upon itself.

Therefore, once seedlings 2 are flipped and roots that were growing downwards from the hydroponic trays or strips are exposed upwards, the roots naturally grow back down (positive geotropism), generating an interlaced root mass as shown in FIG. 1C. This procedure, along with the cultivation of seeds in constant darkness, prevents the growth of leaves and stems, and focuses on root growth. Finally, after a period of six to eight days from seed sowing, a root mass 3 is obtained ready for harvest as shown in FIG. 1D.

In a preferred embodiment, the harvested root mass 3 is drained through any physical method known in the prior art that allows elimination of water excess contained. Preferably, it can be drained by centrifugation or pressing for about 3 to 6 hours. The root extract obtained in this step, has excellent moisturizing and emollient properties and can be used by the cosmetic and pharmaceutical industries for treating skin diseases, such as eczema, dermatitis, urticaria, pruritus, among others. It relieves skin irritation caused by allergies and pain caused by heat exposure, either due to direct sunlight, fire or hot objects. The composition of this extract will vary slightly depending on seed species used. Table 1 shows chemical composition of oat root extract, as an example.

TABLE 1

Chemical composition of oat root extract.

| Chemical properties | Composition |
| --- | --- |
| pH | 5.5-6.5 |
| Total protein (%) | 20-40 |
| Phosphorus (P), % | 0.35-045 |
| Calcium (Ca), % | 0.20-0.25 |
| Potassium (K), % | 0.40-0.60 |
| Magnesium (Mg), % | 0.20-0.30 |
| Sodium (Na), % | 0.06-0.01 |
| Sulfur (S), ppm | 0.20-0.40 |
| Copper (Cu), ppm | 10-20 |
| Iron (Fe), ppm | 150-170 |
| Manganese (Mn), ppm | 60-90 |

TABLE 1-continued

Chemical composition of oat root extract.

| Chemical properties | Composition |
|---|---|
| Zinc, (Zn), ppm | 30-50 |
| Aluminum (Al), ppm | 70-100 |
| Boron, (B), ppm | 3-5 |

Additionally, due to the phosphorus content, seedling extract acts as a water softener and pH regulator.

Finally, the root mass obtained after drainage of water excess is dried for storage and distribution. The drying process is preferably carried out using natural methods by exposing the root mass to the sun, but any other means for forced drying can be used, for example by using an oven.

Once the dry root mass is obtained, it can be used as raw material for making panels for construction industry, given its excellent thermal and acoustic insulation characteristics. By means of a hot pressing process and addition of heat-stable adhesives to this dry root mass obtained by the method of the present invention, panels can be developed with partial or total replacement of wood for making root-fiber mass panels (MDF type), root-particles mass panels (PB type), partial replacement of wooden sheets by root mass to obtain root mass-plywood boards or root mass-raw (plywood type) panels, as well as panels alternative to SIP (Structural Insulated Panel), wherein using the root mass allows partial substitution of wood and total replacement of expanded polystyrene, with an insulation capacity 4 times higher than a polystyrene panel. Panels made with root mass, as well as mixed panels in which the outer plates are made with wood products, have an incredibly significant impact on reducing exploitation of forests.

On the other hand, the dry root mass can also be used as a natural soil improver substrate, when manufactured by the process described in the present invention, which does not involve the use of chemicals potentially harmful to growing plants. This root mass has a high porosity and water retention, and mineral composition is ideal to support the growth of healthy and vigorous crops. Furthermore, due to its natural condition, it degrades over time becoming organic soil of excellent quality.

Production time of this raw material is less than two weeks, making it a renewable and sustainable substrate. This root mass can be molded into small bowls or pots and is also an excellent alternative for replacing materials such as peat or coconut fiber.

The invention will now be illustrated according to the following examples, whose purpose is purely illustrative and should not be considered to limiting the scope of the invention in any circumstances.

Example 1: Obtaining of Root Mass from a Hydroponic Culture of Oat Seeds

Selection of Seeds:

Quality of oat seeds was checked and the level of impurities present was determined. Small amounts of seeds were taken randomly from different bags to complete a sample of a kilogram of seeds. Sample was immersed in water, manually stirred, and the number of empty seeds and impurities which remained floating in the water was determined. The percentage of impurities was less than 20%, so the seed bags were suitable for planting purposes.

Disinfection of Seeds:

Once seeds were selected suitable for sowing, they were then washed in a solution of bleach (chlorine 10% p/v) for 3 to 5 minutes. Then, seeds were rinsed with water enough to remove disinfection solution.

Soaking:

In a container with oxygen, the disinfected seeds were immersed in water for 24 hours at a temperature of 15 degrees Celsius.

Aeration of Seeds:

Seeds were placed in open containers to be in contact with atmospheric air, keeping them under dark conditions, during approximately 36 hours.

Planting and Germination:

The already conditioned seeds were placed in trays for planting and moved to a dark room to simulate conditions of darkness inside the soil. Seeds were kept under those conditions for 3 days, with one irrigation during this period.

Flipping:

Once seeds were germinated in the tray, seedlings were flipped, leaving their aerial parts below the tray and exposing the roots apically or upwards. They were kept in dark conditions for 3 days at 15 degrees Celsius, with one irrigation during this period. After this time, the obtained root mass was harvested.

Example 2: Preparation of a Pressed Sheet of Root Mass

From the root mass obtained in Example 1 it was carried out the water elimination process by means of the following operations:

Drainage:

The root mass was drained and allowed to rest about an hour in a grid to remove water naturally by gravity. Additionally, it was centrifuged for about 1 minute, whereby another part of water and non-germinated seeds were eliminated.

Drying:

The reticular mass was slowly dried in the sun for about 12 hours to obtain a root mattress with approximately 10% moisture. Once the drying step finished, this mattress was weighed and measured.

Adhesive Application:

A sufficient amount of adhesive was applied to the dry root mattress, depending on its weight and/or volume thereof and/or the manufacturer instructions of the adhesive. Since the root mattress is a porous body, twice the amount indicated by the manufacturer per square meter was applied.

The adhesive was applied to the root mattress, ensuring that the interstices thereof were penetrated the best way possible. To this purpose, the mattress with the adhesive was pressed in a cold press for no more than 2 minutes in order to promote the penetration of the adhesive into the mattress. Then, the sheet obtained was pressed with a hot press at a temperature of 50° C. for at least 2 minutes and allowed to stand in the cold press for stabilization, during at least 5 days.

After completion of the process, a root mattress pressed sheet was obtained, visually very similar to plywood with a thickness of about 4 mm. The product obtained was worked according to the desired dimensions and is useful as a substitute for wood in the manufacture of wood panels or products with a similar base.

Example 3. Using the Pressed Sheet Obtained from the Root Mass as Acoustic and Thermal Insulating Material The pressed sheet obtained from the produced root mass (PSRM) from the previous example exhibited excellent characteristics such as thermal and acoustic insulation. It is 100% natural, biodegradable, renewable, fast to produce, fire resistant, and also demonstrated a superior or equal thermal capacity when compared to those used in the industry, produced mainly from petroleum. Since the mattress is thermally more efficient, the same properties as similar products in the market were obtained, but with the advantage of having a much inferior thickness, which substantially facilitates and economizes transfer and storage.

Acoustic absorption coefficient ($\alpha$) of sheet obtained by the method of the invention was determined according to standard ISO 10354-2:1998: "Acoustics-Determination of sound absorption coefficient and impedance in impedance tubes—Part 2: Transfer-function method". The measurement of the absorption characteristics at normal incidence on the sample is based on measurements in a plane wave tube to obtain the transfer function:

$$\alpha = 1 - \left(\frac{H_{12} - e^{-jks}}{e^{jks} - H_{12}}\right) \times e^{f2kL}$$

wherein,
$H_{12}$: Transfer Function,
k: wave number ($m^{-1}$),
s: distance between microphones (m),
L: impedance tube length (m).

The test was performed following the procedure of the reference standard. Two positions of microphone were defined: speaker was set at one end of the tube and the test sample at the opposite end. The sound signal used for the test was white noise and it was measured by ⅓ octave bands, registering the central frequencies between 125 and 1000 Hz. The area of the test sample was 0.3 m2, at an internal temperature of impedance tube of 19 degrees Celsius.

Figure 4:
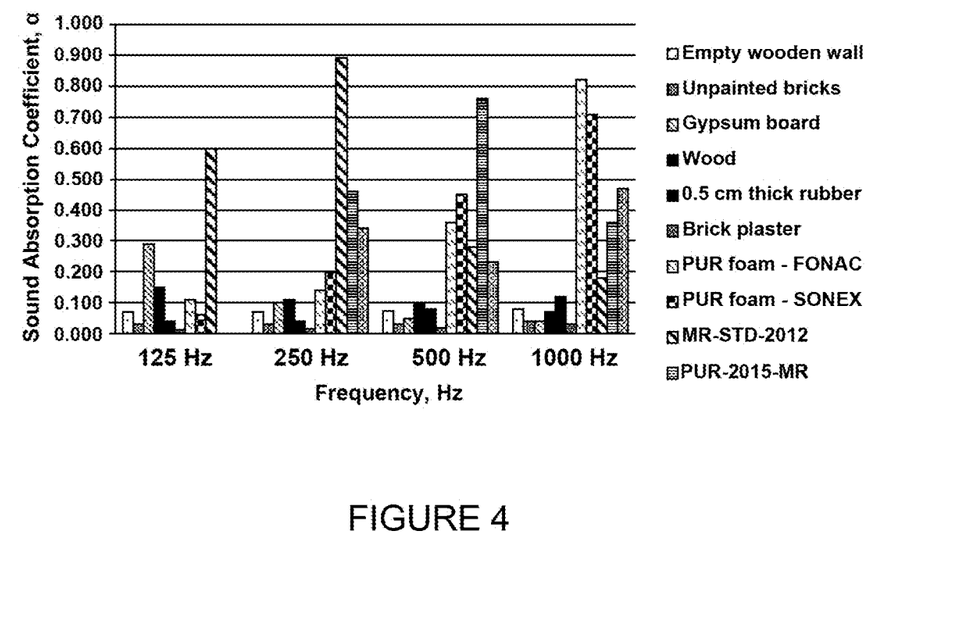
FIG. 4 is a graphical representation of the ability of the pressed sheet of root mass (PSRM) obtained by the inven

Table 2 shows the results obtained regarding the sound absorption of said material as an object of the invention compared with other known and used for the same purpose. FIG. 4 shows a graphical representation of the results shown in Table 2. The materials used for this analysis were: empty wooden wall, unpainted bricks, gypsum board, wood, 0.5 cm thick rubber, brick plaster, rigid polyurethane foam FONAC® (PUR foam—FONAC®), Polyurethane foam SONEX® (PUR foam—SONEX®), Root Mass Standard 2012, corresponding to the material disclosed in international patent application No. PCT/CL2009/000017 (MR-STD-2012), root mass of the present invention mixed with polyurethane (PUR-2015-MR), and root mass of the present invention (MR-2015).

FIG. 4 shows a graphical representation wherein the dotted line represents the limit value of materials considered best insulators in the market today. These results show that the root mass object of the present invention has an acoustic capacity able to compete with recent insulator materials in the art, specially designed for acoustic insulation applications, such as SONEX® and FONAC polyurethane foams.

TABLE 2

Comparative data of sound absorption coefficient ($\alpha$) for different materials.

| Material | 125 Hz | 250 Hz | 500 Hz | 1.000 Hz |
|---|---|---|---|---|
| Empty wooden wall | 0.071 | 0.07 | 0.073 | 0.08 |
| Unpainted brick | 0.03 | 0.03 | 0.03 | 0.04 |
| Gypsum board | 0.29 | 0.1 | 0.05 | 0.04 |

TABLE 2-continued

Comparative data of sound absorption coefficient ($\alpha$) for different materials.

| Material | 125 Hz | 250 Hz | 500 Hz | 1.000 Hz |
|---|---|---|---|---|
| Wood | 0.15 | 0.11 | 0.1 | 0.07 |
| 0.5 cm thick rubber | 0.04 | 0.04 | 0.08 | 0.12 |
| Brick wall with plaster | 0.013 | 0.015 | 0.02 | 0.03 |
| PUR foam - FONAC ® | 0.11 | 0.14 | 0.36 | 0.82 |
| PUR foam - SONEX ® | 0.06 | 0.2 | 0.45 | 0.71 |
| MR - 2012 | 0.6 | 0.89 | 0.28 | 0.18 |
| MR - PUR - 2015 | n.d. | 0.46 | 0.76 | 0.36 |
| MR - 2015 | n.d. | 0.34 | 0.23 | 0.47 |

To determine the thermal insulation, the thermal conductivity of the root mass obtained by the present invention was measured and compared with materials known in the industry. The guard ring method was used, according to the procedure described in the Chilean norm NCH Of.2008 850 "Thermal insulation—Determination of steady-state thermal conductivity through the guard ring method." The apparatus used consisted of a central metal plate (hot plate) provided with electric heating. This plate was surrounded in a frame shape (guard ring) which can be heated independently. On both sides of the plates, specimens with equal size and parallel flat faces are put. Water-cooled metal plates (cold plates) are adjusted to the specimens. The entire assembly thus constituted forms a sandwich in intimate contact. This method determines, under stationary conditions, the heat flux produced electrically in the hot plate, which crosses both specimens, and the respective temperatures between their faces. The measuring area equal to the area of the hot plate, is 0.0255 $m^2$, specimens dimensions are 0.3×0.3 m and a maximum thickness of 50 mm. Due to the design of the conductivity meter, the orientation layout of the specimens is vertical. The thermal conductivity of the material is calculated according to the formula below:

$$\lambda = \left(\frac{\phi \times \varphi}{2A(T1 - T2)}\right)$$

$\lambda$: thermal conductivity (W/m K),
$\varphi$: heat flow through the material (W),
A: Measurement area ($m^2$),
T1, T2: average temperatures of hot and cold faces, respectively (K).

Figure 5:
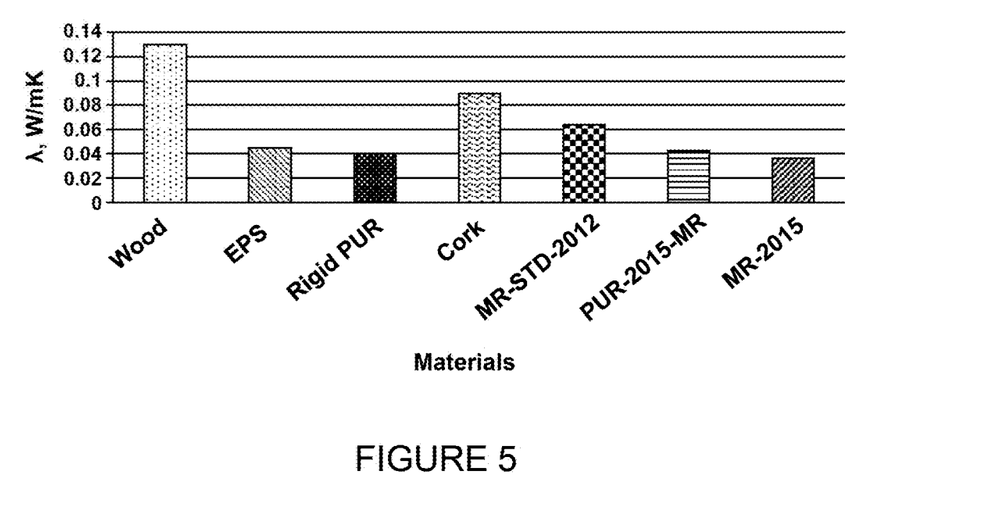
- FIG. 5 is a graphical representation of the ability of the pressed sheet of root mass (PSRM) obtained by the invention, in terms of thermal insulation, which is similar to that of the best insulators used in the art, with a thermal conductivity λ=0.036 W/m².

Table 3 shows the results concerning the thermal conductivity of the material of the invention regarding other known and used for the same purpose. FIG. 5 shows a graphical representation of the results shown in Table 3. The materials used for this analysis were: aluminum, steel, brick, wood, glass wool, polystyrene (EPS), rigid polyurethane (PUR), cork, Mass Root Standard 2012, corresponding to that disclosed in international patent application No. PCT/CL2009/000017 (MR-STD-2012), root mass of the present invention mixed with polyurethane (PUR-2015-MR), and root mass of the present invention (MR-2015). FIG. 4 shows a dotted line representing the limit value of materials considered best thermal insulators in the market today. These results show that the root mass object of the present invention has a thermal insulation capacity similar to the best insulators, with a $\lambda$ value of 0.04 W/m K, and stands as one of the insulation materials with highest performance in the market as EPS and PUR.

TABLE 3

Comparative data of the thermal conductivity (λ) for different insulating materials.

| Material | Thermal conductivity W/m K |
|---|---|
| Aluminum | 209.3 |
| Steel | 47-58 |
| Brick | 0.8 |
| Wood | 0.13 |
| Glass wool | 0.03-0.07 |
| EPS | 0.035-0.045 |
| Rigid PUR | 0.035-0.045 |
| Cork | 0.07-0.09 |
| MR - 2012 | 0.064 |
| MR - PUR 2015 | 0.042 |
| MR - 2015 | 0.036 |

The invention claimed is:

1. A method for obtaining root mass from Poaceae plant seeds, comprising steps of:
   providing seeds of a Poaceae plant,
   allowing germination of seeds in a hydroponic culture in darkness for obtaining seedlings,
   flipping the seedlings obtained so that the roots are exposed apically, and keeping the seedlings in that position in darkness so the roots can grow back down, favoring a high production of root mass and not aerial mass; and
   collecting the root mass obtained after the step of keeping the seedlings in the position,
   wherein no part of the plant is cut during the method.

2. The method of claim 1, wherein the step of allowing the germination of the seeds further comprises the steps of:
   soaking the seeds; and
   aerating the seeds in darkness.

3. The method of claim 2, wherein the step of soaking the seeds is done for 16 to 24 hours at a temperature between 10 and 18 degrees Celsius.

4. The method of claim 2, wherein the step of aerating the seeds is done in darkness for 24 to 48 hours and at a temperature between 10 and 18 degrees Celsius.

5. The method of claim 1, wherein the step of keeping the seedlings in the position in darkness is done by maintaining the seedlings for 3 to 4 days at a temperature between 10 to 18 degrees Celsius in darkness.

6. The method of claim 1, wherein the root mass collected is further subjected to a process of water removal.

7. The method of claim 6, wherein said process of water removal is selected from the group consisting of draining, centrifuging or pressing the root mass.

8. The method of claim 1, wherein the root mass obtained is additionally dried.

* * * * *